United States Patent
Matsuda

(10) Patent No.: US 12,088,339 B2
(45) Date of Patent: Sep. 10, 2024

(54) RECEIVER, OPTICAL SPACE COMMUNICATION SYSTEM, AND OPTICAL SPACE COMMUNICATION RECEPTION METHOD

(71) Applicant: Mitsubishi Electric Corporation, Tokyo (JP)

(72) Inventor: Keisuke Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 52 days.

(21) Appl. No.: 17/953,799

(22) Filed: Sep. 27, 2022

(65) Prior Publication Data

US 2023/0012584 A1 Jan. 19, 2023

Related U.S. Application Data

(63) Continuation of application No. PCT/JP2020/022394, filed on Jun. 5, 2020.

(51) Int. Cl.
*H04B 10/11* (2013.01)
*H04J 14/02* (2006.01)

(52) U.S. Cl.
CPC .............. *H04B 10/11* (2013.01); *H04J 14/02* (2013.01)

(58) Field of Classification Search
CPC . H04B 10/11; H04B 10/1127; H04B 10/1125; H04B 10/2972; H04B 10/118;
(Continued)

(56) References Cited

U.S. PATENT DOCUMENTS

2008/0101310 A1 5/2008 Marzetta
2009/0122898 A1 5/2009 Sun et al.
(Continued)

FOREIGN PATENT DOCUMENTS

JP 2008-514138 A 5/2008
JP 2009-225111 A 10/2009
(Continued)

OTHER PUBLICATIONS

Calvo et al., "Optical technologies for very high throughput satellite communications", Event: SPIE LASE, 2019, San Francisco, California, United States, Proc of SPIE, vol. 10910, Free-Space Laser Communications XXXI, Mar. 4, 2019, 17 total pages.
(Continued)

*Primary Examiner* — Hibret A Woldekidan
(74) *Attorney, Agent, or Firm* — Birch, Stewart, Kolasch & Birch, LLP

(57) ABSTRACT

An optical space communication transmitting terminal includes: a plurality of transmitters that form a plurality of groups and transmit optical signals having wavelengths different from each other; multiplexers that are provided to each of the groups and outputs optical signals wavelength-multiplexed by multiplexing the optical signals transmitted from the transmitters belonging to the group; optical amplifiers that are provided to each of the groups and amplifies the wavelength-multiplexed optical signals; and optical antennas that are provided to each of the groups and transmits the amplified optical signals into space, in which the optical antennas of the groups transmit the optical signals in the same direction.

6 Claims, 6 Drawing Sheets

(58) Field of Classification Search
CPC .. H04B 10/614; H04B 10/548; H04B 10/112; H04B 7/18513; H04B 7/18515; H04B 7/18528; H04B 10/1123; H04B 10/1143; H04B 10/43; H04B 10/1129; H04B 10/40; H04J 14/02; H04J 14/0278; G02F 1/292; G02B 27/0087; H01Q 1/288; H01Q 25/00
See application file for complete search history.

(56) References Cited

U.S. PATENT DOCUMENTS

| | | | |
|---|---|---|---|
| 2019/0123813 A1* | 4/2019 | Mendelsohn | ...... H04B 7/18515 |
| 2019/0312639 A1 | 10/2019 | Ono et al. | |
| 2019/0379449 A1 | 12/2019 | Mendelsohn | |
| 2020/0266885 A1 | 8/2020 | Mendelsohn | |
| 2021/0013966 A1* | 1/2021 | Haraguchi | ......... H04B 10/1127 |
| 2021/0075517 A1 | 3/2021 | Matsuda et al. | |
| 2021/0126705 A1 | 4/2021 | Mendelsohn | |

FOREIGN PATENT DOCUMENTS

| | | |
|---|---|---|
| JP | 2010-507980 A | 3/2010 |
| JP | 2019-500808 A | 1/2019 |
| JP | 6701466 B2 | 5/2020 |
| WO | WO-2019207756 A1 * 10/2019 | ......... H04B 10/1125 |

OTHER PUBLICATIONS

International Search Report (PCT/ISA/210) issued in PCT/JP2020/022394, dated Aug. 11, 2020.
Shubert et al., "System Design of a High Capacity Optical Relay Network", Proc. ICSOS 2019, S3.3, 2019, 5 total pages.
Written Opinion of the International Searching Authority (PCT/ISA/237) issued in PCT/JP2020/022394, dated Aug. 11, 2020.
Extended European Search Report for European Application No. 20939181.2, dated May 19, 2023.

* cited by examiner

RECEIVER, OPTICAL SPACE COMMUNICATION SYSTEM, AND OPTICAL SPACE COMMUNICATION RECEPTION METHOD

CROSS REFERENCE TO RELATED APPLICATIONS

This application is a Continuation of PCT International Application PCT/JP2020/022394, filed on Jun. 5, 2020, which is hereby expressly incorporated by reference into the present application.

TECHNICAL FIELD

The present disclosure relates to a receiver, an optical space communication system, and an optical space communication reception method.

BACKGROUND ART

Optical space communication uses a light having a shorter wavelength as a carrier than that in microwave wireless communication, and can efficiently transmit light with suppressed beam spread. Therefore, application of the optical space communication to feeder link of next-generation geostationary satellites has been studied (See, for example, Non-Patent Literature 1.

CITATION LIST

Non-Patent Literature

Non-Patent Literature 1: P. Shubert et al., "System Design of a High Capacity Optical Relay Network", Proc. ICSOS 2019, S3.3.

SUMMARY OF INVENTION

Technical Problem

As described in Non-Patent Literature 1, in order to achieve Tbps class feeder link in the optical space communication, optical power of more than 100 W is required. However, it is difficult to realize a high-output optical amplifier of a class higher than 100 W, and in a conventional optical space communication technology, there is a problem that a communication capacity decreases due to insufficient output of an optical amplifier. For example, when the output of the optical amplifier is insufficient, the transmission power of the optical space communication transmitting terminal is insufficient, and accordingly, the optical power reaching the optical space communication receiving terminal is also insufficient, and the signal-to-noise ratio (SNR) of the signal demodulated from the reception signal decreases, so that the communication capacity decreases.

The present disclosure solves the above problems, and an object thereof is to obtain a receiver, an optical space communication system, and an optical space communication reception method capable of suppressing a decrease in communication capacity due to an insufficient output of an optical amplifier in optical space communication.

Solution to Problem

An optical space communication system according to the present disclosure includes: an optical space communication terminal; and a receiving terminal, wherein the optical space communication terminal includes: a plurality of transmitters forming a plurality of groups and respectively transmit optical signals of wavelengths different from each other; a plurality of multiplexers each provided to each of the plurality of groups to output an optical signal obtained by wavelength-multiplexing the optical signals transmitted from transmitters belonging to said each of the plurality of groups; a plurality of optical amplifiers each provided to each of the plurality of groups to amplify the optical signal obtained by wavelength-multiplexing the optical signals; and a plurality of optical antennas each provided to each of the plurality of groups to transmit the amplified optical signal to a space, wherein the receiving terminal receives the amplified optical signal transmitted by the optical space communication terminal, and wherein optical antennas, among the plurality of optical antennas, belonging to a same group among the plurality of groups transmit the amplified optical signal to a same optical antenna of the receiving terminal.

Advantageous Effects of Invention

According to the present disclosure, a plurality of wavelengths to be wavelength-multiplexed are divided into groups, optical signals of different wavelengths are multiplexed for each of the groups, the wavelength-multiplexed optical signals are amplified, and the amplified optical signals are transmitted in the same direction for each of the groups. Therefore, transmission power of each wavelength can be increased. As a result, the optical power reaching the reception side also increases, and the SNR of the signal demodulated from the reception signal is improved, so that it is possible to suppress a decrease in the communication capacity due to the insufficient output of the optical amplifier in the optical space communication.

DESCRIPTION OF EMBODIMENTS

First Embodiment

Figure 1:
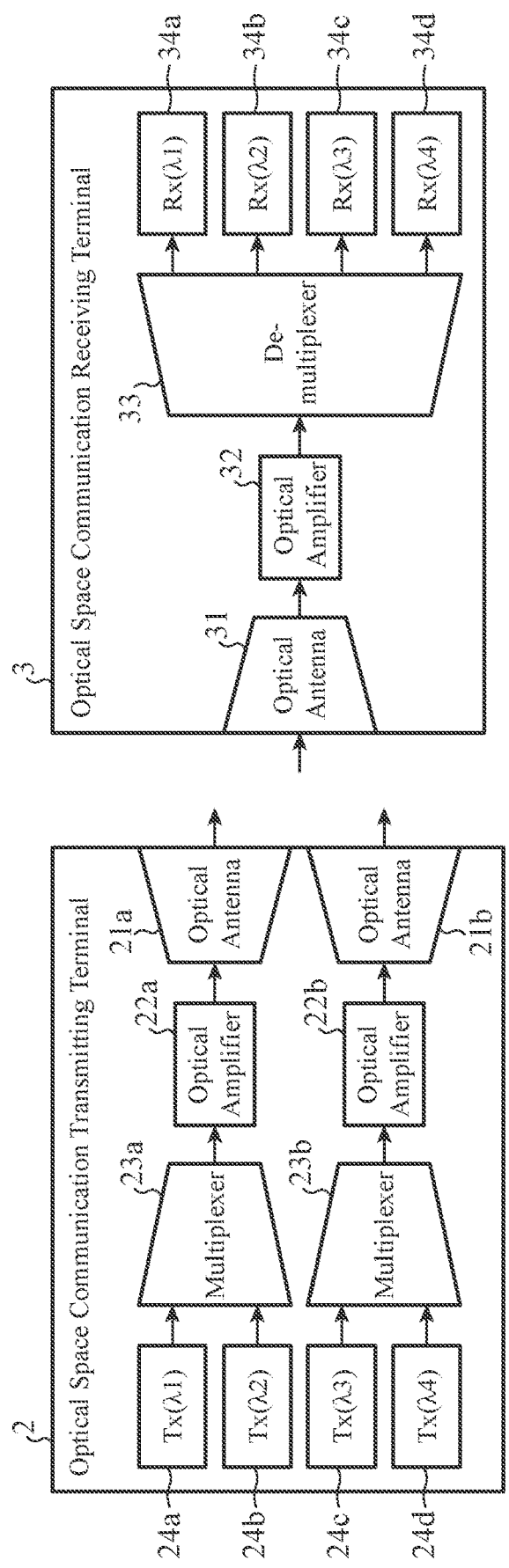
FIG. 1 is a block diagram illustrating a configuration of an optical space communication system according to a first embodiment.

FIG. 1 is a block diagram illustrating the configuration of an optical space communication system 1 according to a first embodiment. In FIG. 1, the optical space communication system 1 is, for example, a system that communicates optical signals in which light beams having four different wavelengths $\lambda 1$ to $\lambda 4$ are wavelength-multiplexed, and includes an optical space communication transmitting terminal 2 and an optical space communication receiving terminal 3.

The optical space communication transmitting terminal 2 transmits an optical signal obtained by wavelength-multiplexing light having wavelengths $\lambda 1$ to $\lambda 4$. The optical signal is a signal obtained by mapping a transmission signal to the optical space communication receiving terminal 3 to a signal point for an optical signal. The optical space communication receiving terminal 3 receives an optical signal transmitted by the optical space communication transmitting terminal 2. The transmission signal is demapped from the signal point of the optical signal received by the optical space communication receiving terminal 3.

The components of the optical space communication transmitting terminal 2 are divided into a group (1) and a group (2). An optical antenna 21*a*, an optical amplifier 22*a*, a multiplexer 23*a*, a transmitter 24*a*, and a transmitter 24*b* belong to the group (1). An optical antenna 21*b*, an optical amplifier 22*b*, a multiplexer 23*b*, a transmitter 24*c*, and a transmitter 24*d* belong to the group (2). The group (1) transmits an optical signal obtained by wavelength-multiplexing adjacent wavelength $\lambda 1$ and wavelength $\lambda 2$ among the four wavelengths $\lambda 1$ to $\lambda 4$, and the group (2) transmits an optical signal obtained by wavelength-multiplexing adjacent wavelength $\lambda 3$ and wavelength $\lambda 4$.

As the plurality of wavelengths to be wavelength-multiplexed, those having no overlap in the spectral band of the optical signal at the interval of adjacent wavelengths are used. For example, in the group (1), there is no overlap between the spectral band of the optical signal having the wavelength $\lambda 1$ and the spectral band of the optical signal having the wavelength $\lambda 2$, and in the group (2), there is no overlap between the spectral band of the optical signal having the wavelength $\lambda 3$ and the spectral band of the optical signal having the wavelength $\lambda 4$. Moreover, there is no overlap between the spectral band of the optical signal of any wavelength in the group (1) and the spectral band of the optical signal of any wavelength in the group (2). As a result, interference between optical signals having close wavelengths is suppressed.

In the group (1), the transmitter 24*a* is a coherent transmitter (Tx ($\lambda 1$)) that transmits an optical signal having a wavelength $\lambda 1$, and the transmitter 24*b* is a coherent transmitter (Tx ($\lambda 2$)) that transmits an optical signal having a wavelength $\lambda 2$. The multiplexer 23*a* generates an optical signal in which the wavelengths $\lambda 1$ and $\lambda 2$ are wavelength-multiplexed by multiplexing the optical signal having the wavelength $\lambda 1$ and the optical signal having the wavelength $\lambda 2$. The optical amplifier 22*a* amplifies the wavelength multiplexed signal generated by the multiplexer 23*a*.

In the group (2), the transmitter 24*c* is a coherent transmitter (Tx ($\lambda 3$)) that transmits the optical signal having the wavelength $\lambda 3$, and the transmitter 24*d* is a coherent transmitter (Tx ($\lambda 4$)) that transmits the optical signal having the wavelength $\lambda 4$. The multiplexer 23*b* generates an optical signal in which the wavelengths $\lambda 3$ and $\lambda 4$ are wavelength-multiplexed by multiplexing the optical signal having the wavelength $\lambda 3$ and the optical signal having the wavelength $\lambda 4$. The optical amplifier 22*b* amplifies the wavelength multiplexed signal generated by the multiplexer 23*b*.

The optical antenna 21*a* belonging to the group (1) transmits the optical signal, in which the wavelength $\lambda 1$ and the wavelength $\lambda 2$ are wavelength-multiplexed and which is amplified by the optical amplifier 22*a*, to the optical space communication receiving terminal 3. Similarly, the optical antenna 21*b* belonging to the group (2) transmits the optical signal, in which the wavelength $\lambda 3$ and the wavelength $\lambda 4$ are wavelength-multiplexed and which is amplified by the optical amplifier 22*b*, to the optical space communication receiving terminal 3. That is, the optical antenna 21*a* and the optical antenna 21*b* transmit optical signals in the same direction in which a common transmission target is present.

Since there is a limit to the output power of each of the optical amplifier 22*a* and the optical amplifier 22*b*, the optical space communication transmitting terminal 2 divides a plurality of wavelengths to be wavelength-multiplexed into N (N is an integer of 2 or more) groups, multiplexes optical signals of different wavelengths for each group, amplifies the wavelength-multiplexed optical signals, and transmits the amplified optical signals in the same direction for each group. As a result, the transmission power of the signal of each wavelength becomes N times, and the signal of the optical power of N times per each wavelength is received with respect to the optical space communication receiving terminal 3. Therefore, in the optical space communication transmitting terminal 2, the SNR is improved by about N times, and a communication capacity of about N times can be achieved.

Since the optical signal output from the optical antenna 21*a* and the optical signal output from the optical antenna 21*b* have different wavelengths, interference is reduced. As a result, a wavelength multiplexed optical signal is transmitted to the optical space communication receiving terminal 3, similarly to the wavelength multiplexed signal transmitted by one optical antenna is transmitted.

In the optical space communication transmitting terminal 2, the output power of each optical amplifier can be lowered without changing the communication capacity as compared with the case where the optical signals having the wavelengths $\lambda 1$ to $\lambda 4$ are multiplexed to be one wavelength multiplexed signal, amplified by one optical amplifier, and then transmitted by one optical antenna. That is, although the transmission power of the signal of each wavelength increases, the transmission power of each optical antenna decreases, so that the optical space communication transmitting terminal 2 is effective from the viewpoint of eye safety.

In the optical space communication transmitting terminal 2, transmission systems of optical signals having close wavelengths among a plurality of wavelengths to be wavelength-multiplexed are grouped into the same group. As a result, the wavelength range supported by the optical amplifiers and the optical antennas belonging to the same group is narrower than those in a case where all optical signals obtained by wavelength multiplexing of a plurality of wavelengths are collectively amplified and transmitted, so that the wavelength dependency of the gain in the optical amplifiers is reduced.

In an optical amplifier having a filter therein for keeping the gain constant, the loss of the filter is reduced. Since the wavelength range supported by the optical antenna for each group is narrowed by dividing the optical signals of the plurality of wavelengths into groups, the optical system having a simpler configuration is allowed for the optical space communication transmitting terminal 2. For example, the number of lenses for suppressing chromatic aberration can be reduced, and the number of layers of a dielectric multilayer film for preventing reflection can be reduced.

The optical space communication receiving terminal 3 includes an optical antenna 31, an optical amplifier 32, a demultiplexer 33, a receiver 34a, a receiver 34b, a receiver 34c, and a receiver 34d. The optical antenna 31 collects the light transmitted from the optical space communication transmitting terminal 2 and propagating in the space. The optical amplifier 32 amplifies the light collected by the optical antenna 31. The demultiplexer 33 demultiplexes the optical signal wavelength-multiplexed with the light amplified by the optical amplifier 32 for each wavelength.

The receiver 34a is a coherent receiver (Rx ($\lambda$1)) that receives an optical signal having a wavelength $\lambda$1 among the optical signals demultiplexed for each wavelength by the demultiplexer 33. The receiver 34b is a coherent receiver (Rx ($\lambda$2)) that receives an optical signal having a wavelength $\lambda$2 among the optical signals demultiplexed for each wavelength by the demultiplexer 33. The receiver 34c is a coherent receiver (Rx ($\lambda$3)) that receives an optical signal having a wavelength $\lambda$3 among the optical signals demultiplexed for each wavelength by the demultiplexer 33. The receiver 34d is a coherent receiver (Rx ($\lambda$4)) that receives an optical signal having a wavelength $\lambda$4 among the optical signals demultiplexed for each wavelength by the demultiplexer 33.

The angle formed by two straight lines connecting the opening center of the optical antenna 21a and the opening center of the optical antenna 21b included in the optical space communication transmitting terminal 2 with the opening center of the optical antenna 31 of the optical space communication receiving terminal 3 as an apex falls within an allowable angle error range with respect to incident light in the optical space communication receiving terminal 3. As a result, the light transmitted by the optical antenna 21a and the optical antenna 21b included in the optical space communication transmitting terminal 2 is incident on the optical antenna 31 included in the optical space communication receiving terminal 3 at an incident angle within the allowable angle error range, and is received in the similar manner as the wavelength multiplex signal transmitted by one optical antenna.

For example, when the communication distance between the optical space communication transmitting terminal 2 and the optical space communication receiving terminal 3 is long, the angle formed by two straight lines connecting the opening center of the optical antenna 21a and the opening center of the optical antenna 21b with the opening center of the optical antenna 31 as an apex is an extremely small angle. Therefore, the angle falls, as a result, within the allowable angle error range with respect to the incident light in the optical space communication receiving terminal 3.

In the above description, the case where the optical space communication transmitting terminal 2 performs wavelength multiplexing of optical signals of four wavelengths has been described. However, signals of two wavelengths different from each other may be wavelength-multiplexed, or three or more wavelengths may be wavelength-multiplexed. Moreover, in the above description, the components of the optical space communication transmitting terminal 2 are divided into the group (1) and the group (2), but the components of the optical space communication transmitting terminal 2 may be divided into three or more groups.

Furthermore, in the above description, the case where two different wavelengths of two signals are wavelength-multiplexed for each group in the optical space communication transmitting terminal 2 has been described, but the number of wavelengths to be wavelength-multiplexed in each group may not be the same. For example, in a case where the number of wavelengths to be wavelength-multiplexed is five, three different wavelengths of three signals may be wavelength-multiplexed in the group (1), and two different wavelengths of two signals may be wavelength-multiplexed in the group (2).

As described above, the optical space communication transmitting terminal 2 according to the first embodiment divides a plurality of wavelengths to be wavelength-multiplexed into groups, multiplexes optical signals having different wavelengths for each group, amplifies the wavelength-multiplexed optical signals, and transmits the amplified optical signals in the same direction for each group. As a result, the optical space communication transmitting terminal 2 can increase the transmission power of each wavelength, and accordingly, the optical power reaching the reception side also increases, and the SNR of the signal demodulated from the reception signal is improved, so that it is possible to suppress a decrease in the communication capacity due to the insufficient output of the optical amplifier in the optical space communication.

In the optical space communication system 1 according to the first embodiment, an angle formed by two straight lines connecting the opening center of the optical antenna 21a and the opening center of the optical antenna 21b included in the optical space communication transmitting terminal 2 with the opening center of the optical antenna 31 of the optical space communication receiving terminal 3 as an apex falls within an allowable angle error range with respect to the incident light in the optical space communication reception terminal 3. As a result, the optical space communication receiving terminal 3 can receive the light transmitted by the optical antenna 21a and the optical antenna 21b in the similar manner as the light transmitted by one optical antenna.

Second Embodiment

Figure 2:
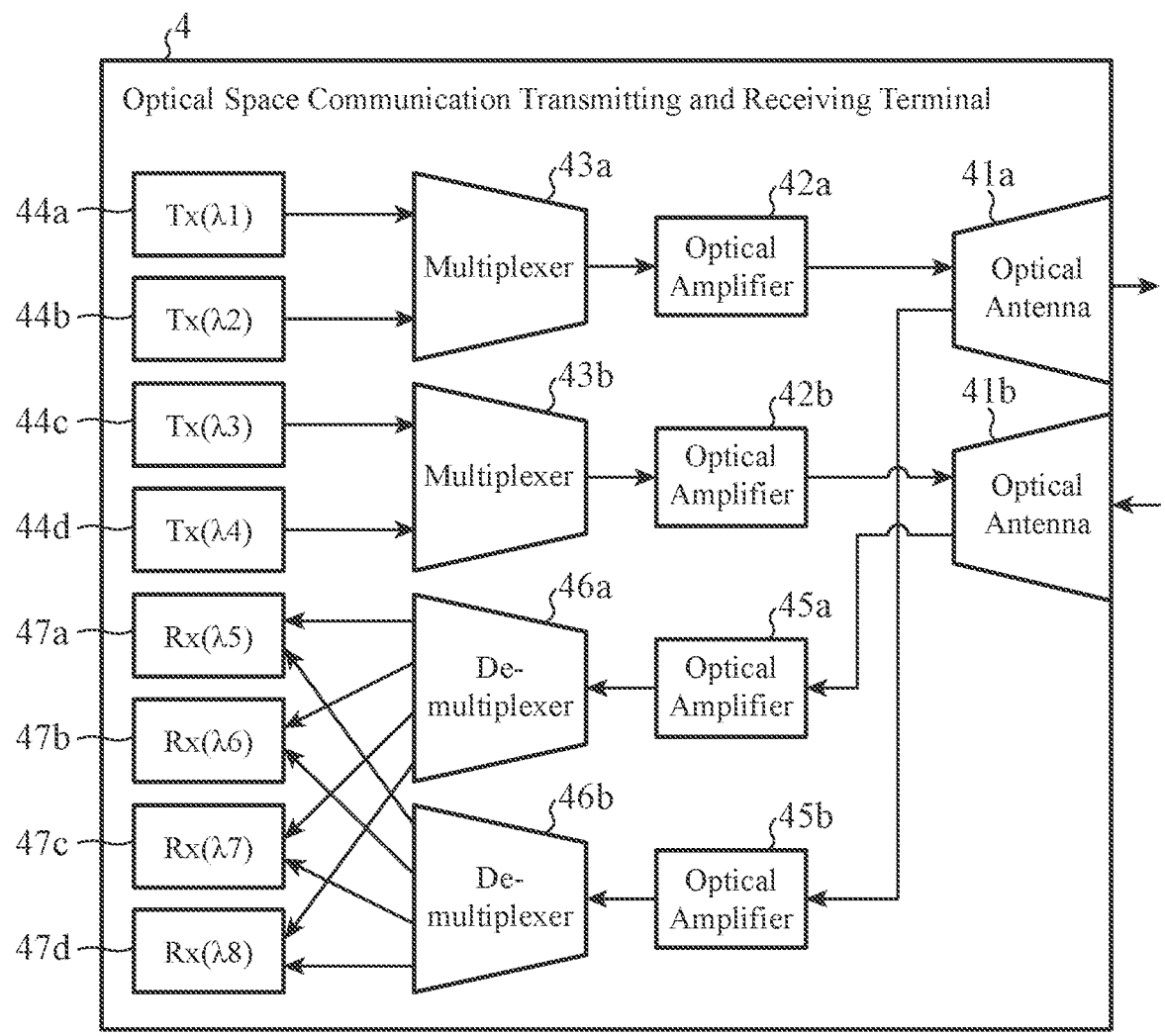
FIG. 2 is a block diagram illustrating a configuration of an optical space communication terminal according to a second embodiment.

FIG. 2 is a block diagram illustrating the configuration of an optical space communication transmitting and receiving terminal 4 which is an optical space communication terminal according to a second embodiment. In FIG. 2, the optical space communication transmitting and receiving terminal 4 is an optical space communication terminal that transmits an optical signal obtained by wavelength-multiplexing light having wavelengths $\lambda$1 to $\lambda$4 and receives an optical signal obtained by wavelength-multiplexing light having wavelengths $\lambda$5 to $\lambda$8, and transmits and receives the optical signal using an optical antenna 41a and an optical antenna 41b.

Moreover, the optical space communication transmitting and receiving terminal 4 includes an optical amplifier 42a, an optical amplifier 42b, a multiplexer 43a, a multiplexer 43b, a transmitter 44a, a transmitter 44b, a transmitter 44c, and a transmitter 44d as components that transmit optical signals, and includes an optical amplifier 45a, an optical amplifier 45b, a demultiplexer 46a, a demultiplexer 46b, a receiver 47a, a receiver 47b, a receiver 47c, and a receiver 47d as components that receive optical signals.

Components that transmit optical signals in the optical space communication transmitting and receiving terminal 4 are divided into a group (1) and a group (2) as in the first embodiment. The optical antenna 41a, the optical amplifier 42a, the multiplexer 43a, the transmitter 44a, and the transmitter 44b belong to the group (1). The optical antenna 41b, the optical amplifier 42b, the multiplexer 43b, the transmitter 44c, and the transmitter 44d belong to the group (2). The group (1) transmits an optical signal obtained by wavelength-multiplexing adjacent wavelengths $\lambda$1 and $\lambda$2 among the four wavelengths $\lambda$1 to $\lambda$4. The group (2)

transmits an optical signal obtained by wavelength-multiplexing adjacent wavelengths λ3 and λ4.

As the plurality of wavelengths to be wavelength-multiplexed, those having no overlap in the spectral band of the optical signal between adjacent wavelengths are used as in the first embodiment. For example, in the group (1), there is no overlap between the spectral band of the optical signal having the wavelength λ1 and the spectral band of the optical signal having the wavelength λ2, and in the group (2), there is no overlap between the spectral band of the optical signal having the wavelength λ3 and the spectral band of the optical signal having the wavelength λ4. Moreover, there is no overlap between the spectral band of the optical signal of any wavelength in the group (1) and the spectral band of the optical signal of any wavelength in the group (2). As a result, interference between optical signals having close wavelengths is suppressed.

In the group (1), the transmitter 44a is a coherent transmitter (Tx (11)) that transmits an optical signal having a wavelength λ1, and the transmitter 44b is a coherent transmitter (Tx (λ2)) that transmits an optical signal having a wavelength λ2. The multiplexer 43a multiplexes the optical signal having the wavelength λ1 and the optical signal having the wavelength λ2 to generate an optical signal in which the wavelengths λ1 and λ2 are wavelength-multiplexed. The optical amplifier 42a amplifies the wavelength multiplexed signal generated by the multiplexer 43a.

In the group (2), the transmitter 44c is a coherent transmitter (Tx (λ3)) that transmits the optical signal having the wavelength λ3, and the transmitter 44d is a coherent transmitter (Tx (λ4)) that transmits the optical signal having the wavelength λ4. The multiplexer 43b multiplexes the optical signal having the wavelength λ3 and the optical signal having the wavelength λ4 to generate an optical signal in which the wavelengths λ3 and λ4 are wavelength-multiplexed. The optical amplifier 42b amplifies the wavelength multiplexed signal generated by the multiplexer 43b.

The optical antenna 41a belonging to the group (1) transmits an optical signal, in which the wavelength λ1 and the wavelength λ2 amplified by the optical amplifier 42a are wavelength-multiplexed. Similarly, the optical antenna 41b belonging to the group (2) transmits an optical signal in which the wavelength λ3 and the wavelength λ4 amplified by the optical amplifier 42b are wavelength-multiplexed. That is, the optical antenna 41a and the optical antenna 41b transmit optical signals in the same direction in which a common transmission target is present.

Since there is a limit to the output power of each of the optical amplifiers 42a and the optical amplifier 42b, the optical space communication transmitting and receiving terminal 4 divides a plurality of wavelengths to be wavelength-multiplexed into N (N is an integer of 2 or more) groups, multiplexes optical signals of different wavelengths for each group, amplifies the wavelength-multiplexed optical signals, and transmits the amplified optical signals group in the same direction for each. As a result, the transmission power of the signal of each wavelength becomes N times, and the signal of the optical power of N times per wavelength is received on the reception side. Therefore, in the optical space communication transmitting and receiving terminal 4, the SNR is improved by about N times, and a communication capacity of about N times can be achieved.

In a reception system of the optical signals of the optical space communication transmitting and receiving terminal 4, the optical antenna 41a and the optical antenna 41b collect the light propagating in the space. For example, in a case where the communication distance to the optical space communication transmitting and receiving terminal 4 is long, the light that has propagated through the space and reached the optical space communication transmitting and receiving terminal 4 is sufficiently spread, and thus enters the plurality of optical antennas.

The optical amplifier 45a amplifies the light collected by the optical antenna 41b, and the optical amplifier 45b amplifies the light collected by the optical antenna 41a. The demultiplexer 46a demultiplexes the optical signal for each wavelength wavelength-multiplexed with the light amplified by the optical amplifier 45a, and the demultiplexer 46b demultiplexes the optical signal for each wavelength wavelength-multiplexed with the light amplified by the optical amplifier 45b.

The receiver 47a is a coherent receiver (Rx (λ5)) that receives the optical signal having the wavelength λ5 among the optical signals demultiplexed for each wavelength by the demultiplexer 46a and receives the optical signal having the wavelength λ5 among the optical signals demultiplexed for each wavelength by the demultiplexer 46b. The receiver 47b is a coherent receiver (Rx (λ6)) that receives the optical signal having the wavelength λ6 among the optical signals demultiplexed for each wavelength by the demultiplexer 46a and receives the optical signal having the wavelength λ6 among the optical signals demultiplexed for each wavelength by the demultiplexer 46b.

The receiver 47c is a coherent receiver (Rx (λ7)) that receives the optical signal having the wavelength λ7 among the optical signals demultiplexed for each wavelength by the demultiplexer 46a and receives the optical signal having the wavelength λ7 among the optical signals demultiplexed for each wavelength by the demultiplexer 46b. The receiver 47d is a coherent receiver (Rx (λ8)) that receives the optical signal having the wavelength λ8 among the optical signals demultiplexed for each wavelength by the demultiplexer 46a and receives the optical signal having the wavelength λ8 among the optical signals demultiplexed for each wavelength by the demultiplexer 46b.

Figure 3:
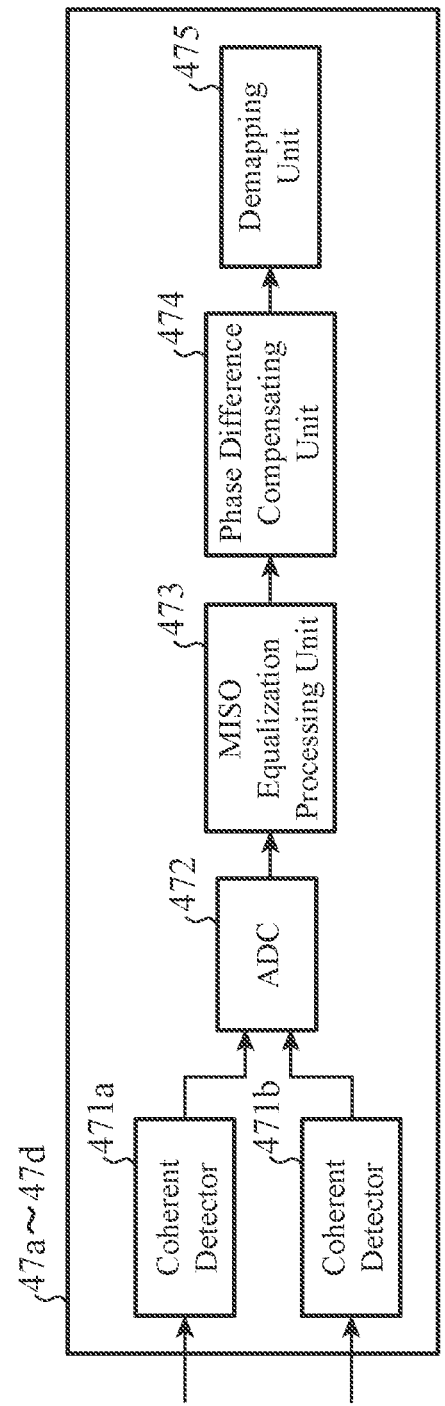
FIG. 3 is a block diagram illustrating a configuration of a receiver according to the second embodiment.

FIG. 3 is a block diagram illustrating the configuration of the receivers 47a to 47d. In FIG. 3, the receivers 47a to 47d are coherent receivers that receive the optical signals demultiplexed by the demultiplexer 46a and the demultiplexer 46b. The receivers 47a to 47d each include a coherent detector 471a, a coherent detector 471b, an ADC 472, a MISO equalization processing unit 473, a phase difference compensating unit 474, and a demapping unit 475. Note that the MISO equalization processing unit 473, the phase difference compensating unit 474, and the demapping unit 475 are functional components included in a digital signal processing circuit connected to the ADC 472.

The coherent detector 471a and the coherent detector 471b are detectors that convert an optical signal having a wavelength demultiplexed by the demultiplexer 46a and the demultiplexer 46b into an electrical signal by interfering with local light (laser light) output from a local light emitting source. For example, in the receiver 47a, the coherent detector 471a causes the optical signal having the wavelength λ5 demultiplexed by the demultiplexer 46a to interfere with the local light output from the local light emitting source to convert the optical signal into an electrical signal. The coherent detector 471b causes the optical signal having the wavelength λ5 demultiplexed by the demultiplexer 46b to interfere with the local light output from the local light emitting source to convert the optical signal into an electrical signal.

The ADC 472 is an AD converter that converts an analog electrical signal corresponding to an optical signal of a wavelength demultiplexed from the reception optical signal into a digital signal using each electrical signal coherently detected by the coherent detector 471a and the coherent detector 471b. For example, in the receiver 47a, the ADC 472 converts an analog electrical signal corresponding to the optical signal having the wavelength λ5 into a digital signal using the electrical signal of the optical signal having the wavelength λ5 detected by the coherent detector 471a and the electrical signal of the optical signal having the wavelength λ5 detected by the coherent detector 471b.

The MISO equalization processing unit 473 performs multiple input single output processing (MISO processing) and equalization processing on the plurality of digital signals converted from the analog electrical signal by the ADC 472. For example, in a case where the MISO equalization processing unit 473 is achieved by an FIR filter, the filter coefficient is adaptively set so that the output of the MISO equalization processing unit 473 approaches the assumed signal point distribution. For the setting of the filter coefficient, a least mean square (LMS) algorithm based on a known signal pattern inserted in advance into a part of the signal may be used, or a method that does not require a known signal pattern, such as a constant envelope reference algorithm or an LMS algorithm based on tentative determination, may be used.

The phase difference compensating unit 474 compensates for the phase difference of the signal subjected to the MISO processing and the equalization processing by the MISO equalization processing unit 473. For example, the phase difference compensating unit 474 compensates the frequency difference and the phase difference between the transmission signal output from the transmitters 44a to 44d and the local light by carrier wave estimation for the signal subjected to the MISO processing and the equalization processing. A series of processes including MISO processing, equalization processing, and phase compensation is demodulation of an optical signal.

The demapping unit 475 decodes the signal whose phase difference has been compensated by the phase difference compensating unit 474. For example, for a signal subjected to the MISO processing and the equalization processing, a bit sequence is output as a reception signal in correspondence with mapping of the bit sequence and the signal in the transmission system. The process of converting the demodulated signal point into bit data is decoding of an optical signal.

Note that the coherent detector 471a, the coherent detector 471b, and the ADC 472 may be not included in the receivers 47a to 47d, but may be included in the terminal. In this case, the receivers 47a to 47d include only a digital signal processing circuit connected to the ADC 472.

An optical space communication reception method according to the second embodiment is as follows.

Figure 4:
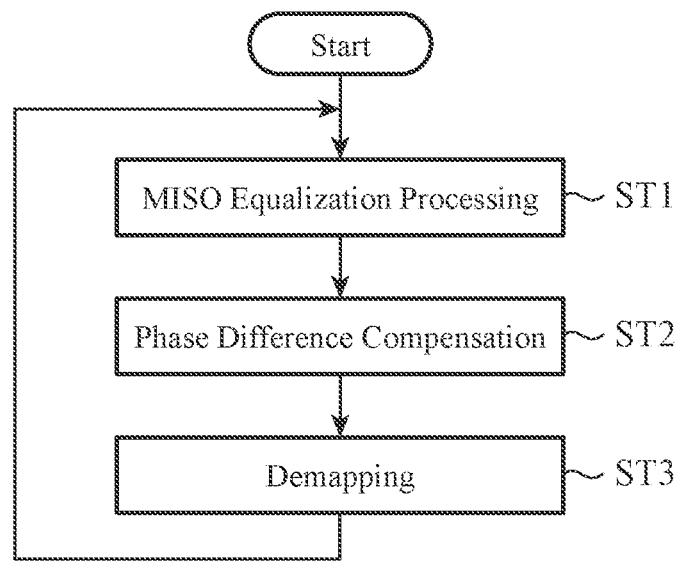
FIG. 4 is a flowchart illustrating an optical space communication reception method according to the second embodiment.

FIG. 4 is a flowchart illustrating the optical space communication reception method according to second embodiment, and illustrates each processing of the MISO equalization processing unit 473, the phase difference compensating unit 474, and the demapping unit 475 in the receivers 47a to 47d. The MISO equalization processing unit 473 performs MISO processing and equalization processing on the plurality of digital signals from the ADC 472 (step ST1). Next, the phase difference compensating unit 474 compensates for the phase difference of the signal subjected to the MISO processing and the equalization processing by the MISO equalization processing unit 473 (step ST2). The demapping unit 475 performs demapping on the signal whose phase difference has been compensated by the phase difference compensating unit 474 (step ST3). The receivers 47a to 47d input signals from the ADC 472 and repeatedly execute the processing in step ST1 to ST3.

The hardware configuration for achieving the functions of the receivers 47a to 47d is as follows.

Figure 5A:
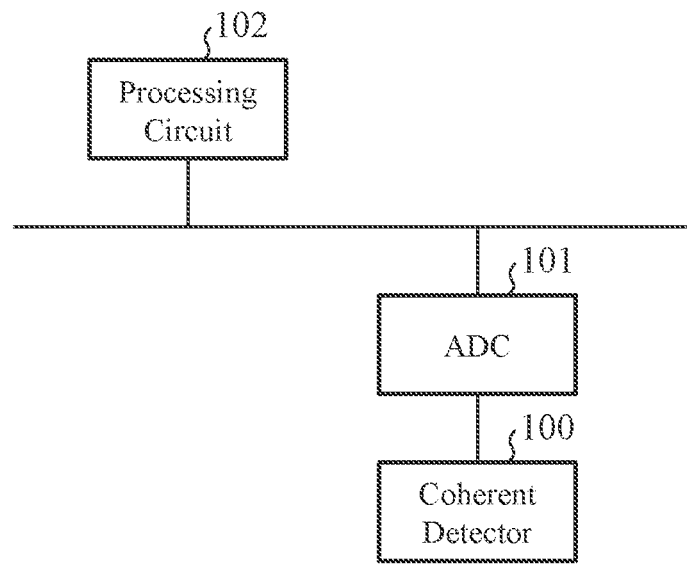
FIG. 5A is a block diagram illustrating a hardware configuration for implementing functions of a receiver according to the second embodiment.
Figure 5B:
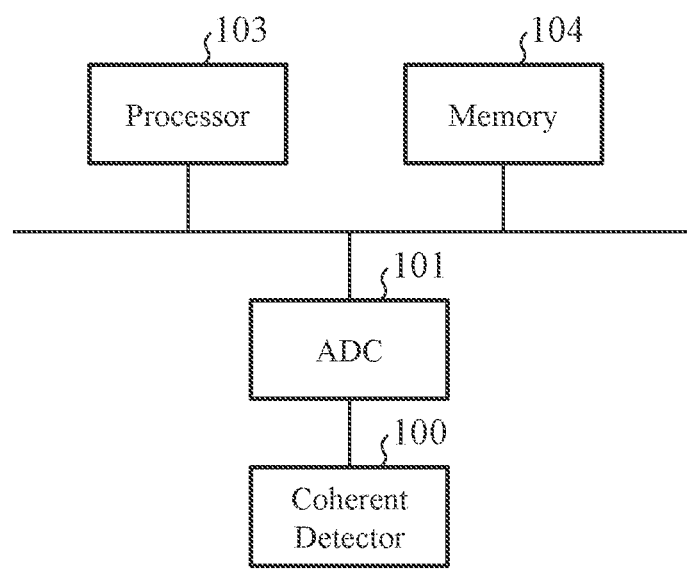
FIG. 5B is a block diagram illustrating a hardware configuration for executing software for implementing the functions of the receiver according to the second embodiment.

FIG. 5A is a block diagram illustrating the hardware configuration for implementing the functions of the receivers 47a to 47d, and FIG. 5B is a block diagram illustrating the hardware configuration for executing software for implementing the functions of the receivers 47a to 47d. In FIGS. 5A and 5B, the coherent detector 100 is the coherent detector 471a and the coherent detector 471b illustrated in FIG. 3, and the ADC 101 is the ADC 472 illustrated in FIG. 3.

The functions of the MISO equalization processing unit 473, the phase difference compensating unit 474, and the demapping unit 475 included in the receivers 47a to 47d are implemented by a processing circuit (digital signal processing circuit). That is, the receivers 47a to 47d include a processing circuit for executing the processing of Steps ST1 to ST3 illustrated in FIG. 4. The processing circuit may be dedicated hardware or a central processing unit (CPU) that executes a program stored in a memory.

In a case where the processing circuit is the processing circuit 102 of dedicated hardware illustrated in FIG. 5A, the processing circuit 102 corresponds to, for example, a single circuit, a composite circuit, a programmed processor, a parallel programmed processor, an application specific integrated circuit (ASIC), a field-programmable gate array (FPGA), or a combination thereof. The functions of the MISO equalization processing unit 473, the phase difference compensating unit 474, and the demapping unit 475 included in the receivers 47a to 47d may be implemented by separate processing circuits, or these functions may be collectively implemented by one processing circuit.

In a case where the processing circuit is the processor 103 illustrated in FIG. 5B, the functions of the MISO equalization processing unit 473, the phase difference compensating unit 474, and the demapping unit 475 included in the receivers 47a to 47d are implemented by software, firmware, or a combination of software and firmware. Note that the software or firmware is described as a program and stored in a memory 104.

The processor 103 reads out and executes the program stored in the memory 104 to implement the functions of the MISO equalization processing unit 473, the phase difference compensating unit 474 and the demapping unit 475 included in the receivers 47a to 47d. For example, the receivers 47a to 47d include the memory 104 that stores a program that, when executed by the processor 103, results in execution of the processing from Step ST1 to Step ST3 illustrated in FIG. 4. These programs cause a computer to execute the procedures or methods performed by the MISO equalization processing unit 473, the phase difference compensating unit 474, and the demapping unit 475. The memory 104 may be a computer-readable storage medium storing a program for causing a computer to function as the MISO equalization processing unit 473, the phase difference compensating unit 474, and the demapping unit 475.

The memory 104 corresponds to, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, or a DVD.

Some part of the functions of the MISO equalization processing unit 473, the phase difference compensating unit 474, and the demapping unit 475 included in the receivers 47a to 47d may be implemented by dedicated hardware, and the remaining may be implemented by software or firmware. For example, the functions of the MISO equalization processing unit 473 and the phase difference compensating unit 474 are implemented by the processing circuit 102 that is dedicated hardware, and the functions of the demapping unit 475 are implemented by the processor 103 reading out and executing a program stored in the memory 104. As described above, the processing circuit can implement the above functions by hardware, software, firmware, or a combination thereof.

As described above, in addition to the configuration of the optical space communication transmitting terminal 2, the optical space communication transmitting and receiving terminal 4 according to the second embodiment includes the demultiplexers 46a and 46b that demultiplex the multiplexed optical signals for the respective wavelengths, and the receivers 47a to 47d that are provided to each of multiplexed wavelengths and receive the optical signals demultiplexed by the demultiplexers 46a and 46b. The optical antennas 41a and 41b collect the light propagated through the space, and the optical amplifiers 45a and 45b amplify the light collected by the optical antennas 41a and 41b. The demultiplexers 46a and 46b demultiplex the light amplified by the optical amplifiers 45a and 45b into optical signals for each wavelength multiplexed with the light, and the receivers 47a to 47d demodulate and decode the optical signals demultiplexed by the demultiplexers 46a and 46b. Since the optical space communication transmitting and receiving terminal 4 has the same configuration as the optical space communication transmitting terminal 2, the same effects as those of the first embodiment can be obtained. Moreover, the noise superimposed on each signal collected by the optical antennas 41a and 41b is mainly generated from the optical amplifiers 45a and 45b at the preceding stages of the demultiplexers 46a and 46b, and is noise independent from each other. Therefore, the optical space communication transmitting and receiving terminal 4 coherently detects the signals collected by the optical antennas 41a and 41b and performs the MISO processing on the coherently detected signals, thereby improving the SNR of the reception signal and suppressing a decrease in communication capacity.

Third Embodiment

Figure 6:
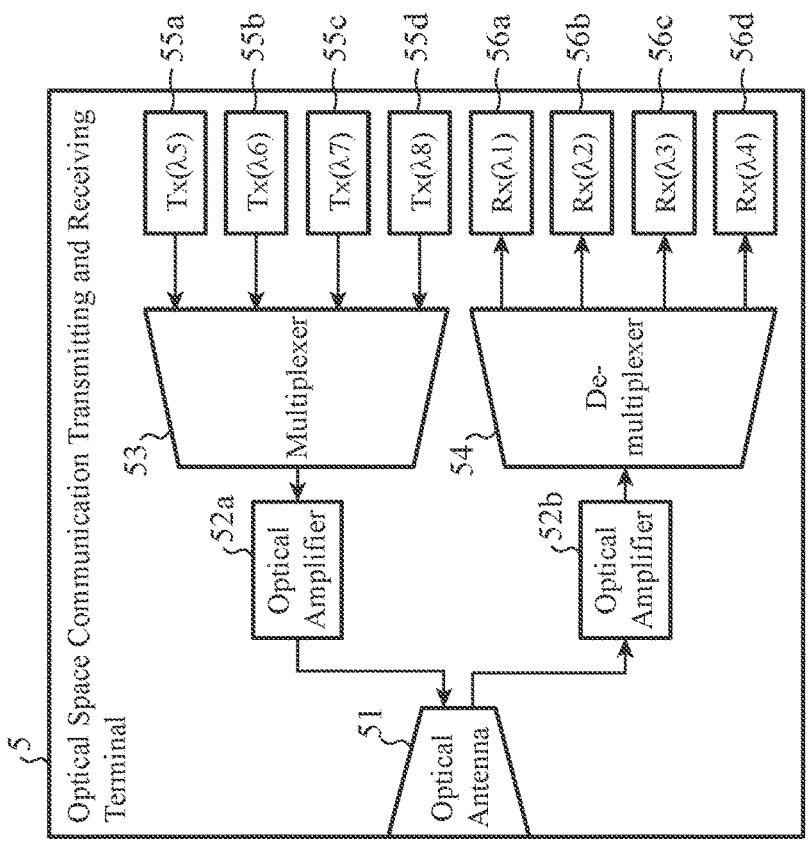
FIG. 6 is a block diagram illustrating a configuration of an optical space communication system according to a third embodiment.
Figure 6:
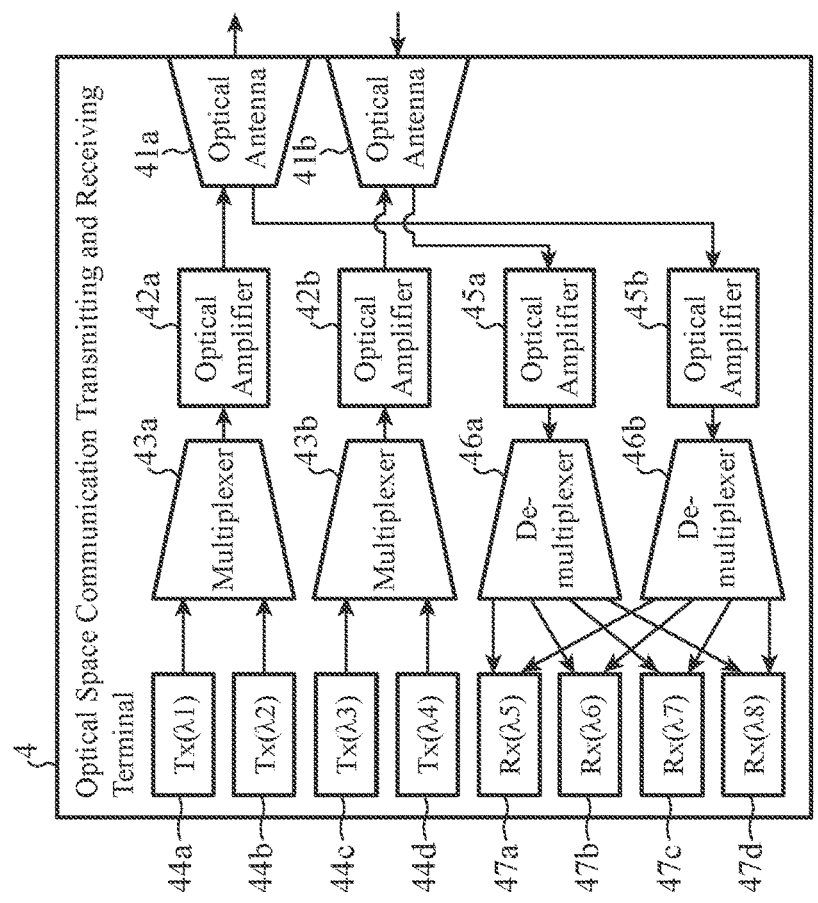

FIG. 6 is a block diagram illustrating the configuration of an optical space communication system 1A according to a third embodiment. In FIG. 6, the optical space communication system 1A is, for example, a system that communicates optical signals in which light beams having four different wavelengths $\lambda 1$ to $\lambda 4$ are wavelength-multiplexed, and communicates optical signals in which light beams having four different wavelengths $\lambda 5$ to $\lambda 8$ are wavelength-multiplexed, and includes an optical space communication transmitting and receiving terminal 4 and an optical space communication transmitting and receiving terminal 5.

The optical space communication transmitting and receiving terminal 4 is a first transmitting and receiving terminal that transmits, to the optical spatial communication transmitting and receiving terminal 5, an optical signal obtained by wavelength-multiplexing the light having the wavelengths $\lambda 1$ to $\lambda 4$, and receives, by the optical space communication transmitting and receiving terminal 5, an optical signal obtained by wavelength-multiplexing the light having the wavelengths $\lambda 5$ to $\lambda 8$. The optical space communication transmitting and receiving terminal 5 is a second transmitting and receiving terminal that transmits, to the optical space communication transmitting and receiving terminal 4, an optical signal obtained by wavelength-multiplexing the light having the wavelengths $\lambda 5$ to $\lambda 8$, and receives, by the optical space communication transmitting and receiving terminal 4, an optical signal obtained by wavelength-multiplexing the light having the wavelengths $\lambda 1$ to $\lambda 4$. That is, the optical space communication transmitting and receiving terminal 4 and the optical space communication transmitting and receiving terminal 5 perform bidirectional communication.

As illustrated in FIG. 6, the optical space communication transmitting and receiving terminal 5 includes an optical antenna 51, an optical amplifier 52a, an optical amplifier 52b, a multiplexer 53, a demultiplexer 54, transmitters 55a to 55d, and receivers 56a to 56d. The transmitters 55a to 55d are coherent transmitters (Tx ($\lambda 5$) to Tx ($\lambda 8$)) that transmit optical signals having wavelengths $\lambda 5$ to $\lambda 8$. The multiplexer 53 multiplexes the optical signals having the wavelengths $\lambda 5$ to $\lambda 8$ to generate an optical signal in which the wavelengths $\lambda 5$ to $\lambda 8$ are wavelength-multiplexed. The optical amplifier 52a amplifies the wavelength-multiplexed signal generated by the multiplexer 53. The optical antenna 51 transmits the wavelength-multiplexed signal amplified by the optical amplifier 52a to the optical space communication transmitting and receiving terminal 4.

The optical antenna 51 collects the light transmitted from the optical space communication transmitting and receiving terminal 4 and propagating in the space. The optical amplifier 52b amplifies the light collected by the optical antenna 51. The demultiplexer 54 demultiplexes the optical signal for each wavelength wavelength-multiplexed with the light amplified by the optical amplifier 52b. The receivers 56a to 56d are coherent receivers (Rx ($\lambda 1$) to Rx ($\lambda 4$)) that receive each of optical signals demultiplexed into the wavelengths $\lambda 1$ to $\lambda 4$ by the demultiplexer 54.

An angle formed by two straight lines connecting the opening center of the optical antenna 41a and the opening center of the optical antenna 41b included in the optical space communication transmitting and receiving terminal 4 with the opening center of the optical antenna 51 of the optical space communication transmitting and receiving terminal 5 as an apex falls within an allowable angle error range with respect to incident light in the optical space communication transmitting and receiving terminal 5. As a result, the light transmitted by the optical antenna 41a and the optical antenna 41b is incident on the optical antenna 51 at an incident angle within an allowable angle error range, and is received in the similar manner as the wavelength multiplexed signal transmitted by one optical antenna.

For example, when the communication distance between the optical space communication transmitting and receiving terminal 4 and the optical space communication receiving/transmitting terminal 5 is long, an angle formed by each of two straight lines connecting the opening center of the optical antenna 41a and the opening center of the optical antenna 41b with the opening center of the optical antenna 51 as an apex is an extremely small angle. Therefore, the angle falls within the allowable angle error range with respect to the incident light in the optical space communication transmitting and receiving terminal 5.

As described above, the optical space communication system 1A according to the third embodiment includes the optical space communication transmitting and receiving terminal 4 and the optical space communication transmitting and receiving terminal 5. An angle formed by two straight lines connecting the opening center of the optical antenna 41a and the opening center of the optical antenna 41b included in the optical space communication transmitting and receiving terminal 4 with the opening center of the optical antenna 51 of the optical space communication transmitting and receiving terminal 5 as an apex falls within an allowable angle error range with respect to incident light in the optical space communication transmitting and receiving terminal 5. As a result, the optical space communication transmitting and receiving terminal 5 can receive the light transmitted by the optical antenna 41a and the optical antenna 41b in the similar manner as the light transmitted by one optical antenna.

Note that combinations of the respective embodiments, modifications of any components of the respective embodiments, or omissions of any components in the respective embodiments are possible.

INDUSTRIAL APPLICABILITY

The optical space communication terminal according to the present disclosure can be utilized for, for example, optical space communication with an artificial satellite.

REFERENCE SIGNS LIST 1, 1A: optical space communication system, 2: optical space communication transmitting terminal, 3: optical space communication receiving terminal, 4, 5: optical space communication transmitting and receiving terminal, 21a, 21b, 31, 41a, 41b, 51: optical antenna, 22a, 22b, 32, 42a, 42b, 45a, 45b, 52a, 52b: optical amplifier, 23a, 23b, 43a, 43b, 53: multiplexer, 24a to 24d, 44a to 44d, 55a to 55d: transmitter, 33, 46a, 46b, 54: demultiplexer, 34a to 34d, 47a to 47d, 56a to 56d: receiver, 471a, 471b: coherent detector, 473: MISO equalization processing unit, 474: phase difference compensating unit, 475: demapping unit.

The invention claimed is:

1. An optical space communication system comprising:
an optical space communication terminal; and
a receiving terminal,
wherein the optical space communication terminal includes:
a plurality of transmitters forming a plurality of groups and respectively transmit optical signals of wavelengths different from each other;
a plurality of multiplexers each provided to each of the plurality of groups to output an optical signal obtained by wavelength-multiplexing the optical signals transmitted from transmitters belonging to said each of the plurality of groups;
a plurality of optical amplifiers each provided to each of the plurality of groups to amplify the optical signal obtained by wavelength-multiplexing the optical signals; and
a plurality of optical antennas each provided to each of the plurality of groups to transmit the amplified optical signal to a space,
wherein the receiving terminal receives the amplified optical signal transmitted by the optical space communication terminal, and
wherein optical antennas, among the plurality of optical antennas, belonging to a same group among the plurality of groups transmit the amplified optical signal to a same optical antenna of the receiving terminal.

2. The optical space communication system according to claim 1, further comprising:

a demultiplexer demultiplexing an optical signal to generate a plurality of wavelength-demultiplexed optical signals;
a plurality of receivers to receive the plurality of wavelength-demultiplexed optical signals respectively;
an optical antenna; and
an optical amplifier,
wherein the optical antenna collects light propagating through a space,
the optical amplifier amplifies the light collected by the optical antenna,
the demultiplexer demultiplexes the light amplified by the optical amplifier into the wavelength-demultiplexed optical signals respectively corresponding to the wavelengths different from each other, and
the plurality of receivers demodulate and decode the wavelength-demultiplexed optical signals respectively.

3. A receiver that demodulates and decodes the wavelength-demultiplexed optical signals demultiplexed by the demultiplexer included in the optical space communication system according to claim 2, the receiver comprising processing circuitry
to receive a plurality of digital signals generated by analog-to-digital conversion after the wavelength-demultiplexed optical signals demultiplexed by the demultiplexer are coherently detected, and perform a multiple input single output process to obtain a digital signal and an equalization process on the plurality of digital signals,
to compensate for a phase difference of the digital signal; and
to decode the digital signal whose phase difference is compensated for.

4. An optical space communication system comprising:
a first transmission/reception terminal that is the optical space communication terminal included in the optical space communication system according to claim 2; and
a second transmission/reception terminal to transmit and receive an optical signal to and from the first transmission/reception terminal,
wherein an angle formed by two straight lines connecting each of two opening centers of the plurality of optical antennas of the first transmission/reception terminal with the opening center of the optical antenna of the second transmission/reception terminal as an apex falls within an allowable angle error range with respect to incident light at the second transmission/reception terminal, and
the first transmission/reception terminal and the second transmission/reception terminal perform bidirectional communication.

5. An optical space communication reception method of a receiver that demodulates and decodes the wavelength-demultiplexed optical signals demultiplexed by a demultiplexer included in the optical space communication terminal included in the optical space communication system according to claim 2, the method comprising:
reception process of receiving a plurality of digital signals generated by analog-to-digital conversion after the wavelength-demultiplexed optical signals demultiplexed by the demultiplexer are coherently detected, and MISO process of performing a multiple input single output process to obtain a digital signal and an equalization process on the plurality of input digital signals;
compensation process of compensating for a phase difference of the digital signal; and decoding process of decoding the digital signal whose phase difference is compensated for, wherein a series of processes including the reception process, the MISO process, the compensation process, and the decoding process is repeatedly executed.

6. An optical space communication system according to claim 1, wherein an angle formed by two straight lines connecting each of two opening centers of the plurality of optical antennas of the optical space communication terminal with the opening center of the optical antenna of the reception terminal as an apex falls within an allowable angle error range with respect to incident light of the reception terminal.

* * * * *